Oct. 8, 1940.  C. C. GALLAGHER  2,217,400
ROPE CLAMP
Filed April 24, 1939
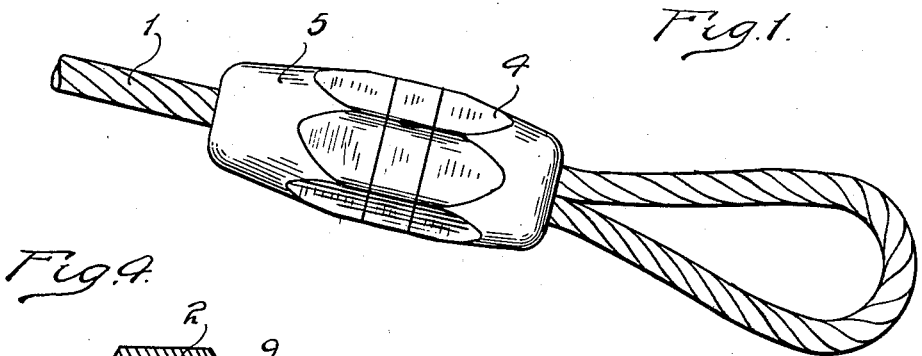
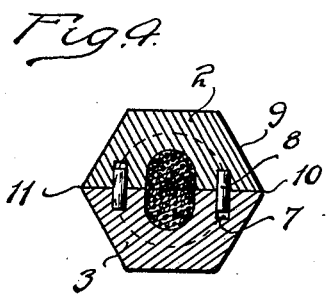
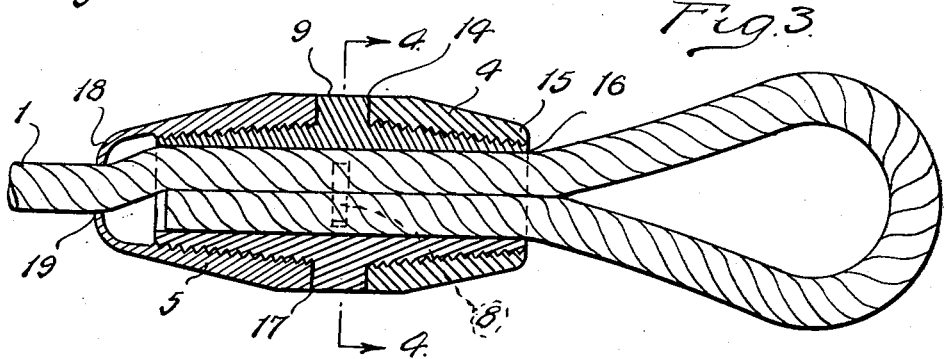
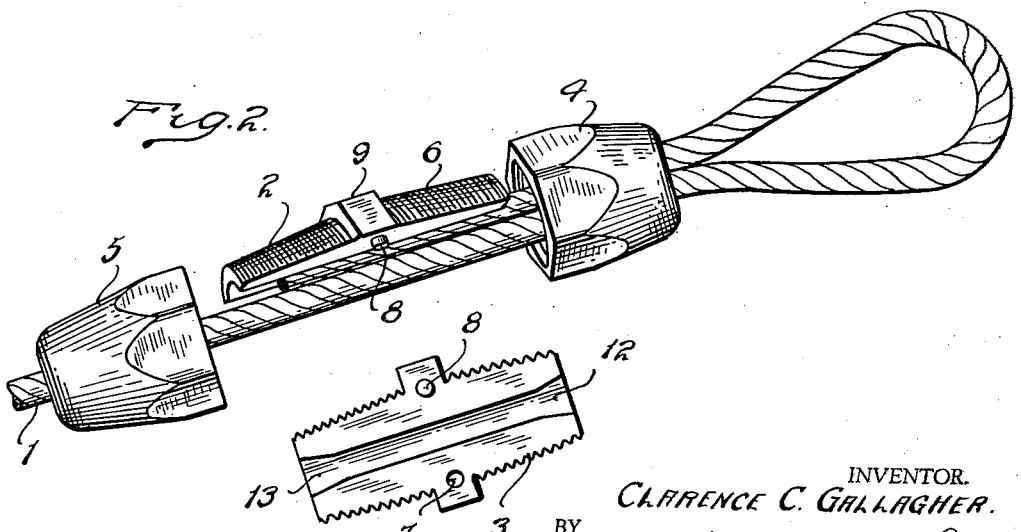
INVENTOR.
CLARENCE C. GALLAGHER.
BY Barnes, Kisselle, Laughlin & Raisch
ATTORNEYS.

Patented Oct. 8, 1940

2,217,400

UNITED STATES PATENT OFFICE 2,217,400

ROPE CLAMP

Clarence C. Gallagher, Detroit, Mich.

Application April 24, 1939, Serial No. 269,662

1 Claim. (Cl. 24—124)

This invention relates to a rope clamp.

Rope clamps of various types are old and well-known. Large quantities of rope clamps are used, for example, on boats such as yachts and sailboats.

One of the defects present in the rope clamps heretofore used is that they are not only unsightly but present sharp corners and edges upon which the sailor or other person handling the rope not infrequently scratches or cuts his hand. It is an object of this invention to produce a rope clamp which obviates the above defect and which is safe to handle without danger of cutting or injuring the handler.

The rope clamps heretofore used clamp the rope in such a manner that they cock relative to the rope. It is an object of this invention to produce a rope clamp which, upon clamping a rope, will have its longitudinal axis aligned or centered with respect to the longitudinal axis of the rope. This causes the clamp to blend or merge itself into the rope.

In the drawing:

Fig. 1 is an elevation showing the clamp applied to a rope, the end of which has been drawn back to form a loop.

Fig. 2 is an exploded view of the clamp.

Fig. 3 is a longitudinal section through the clamp and rope.

Fig. 4 is a section along the line 4—4 of Fig. 3.

Referring more particularly to the drawing there is shown a rope 1 of any suitable material such as wire or hemp strands. The clamp is designed primarily for clamping wire rope commonly known as cable.

The clamp comprises two identical clamp members 2 and 3 and the end nut members 4 and 5. The clamp members 2 and 3 have their exterior surfaces threaded as at 6 and taper from the middle toward the ends. Each clamp is provided with a lug 8 and a socket 7. The lug of the clamp member 3 interengages the socket of the clamp member 2 and the lug of the clamp member 2 interengages the clamp member 3 in the socket 7.

The clamp members 2 and 3 when together are provided centrally with an integral polygonal ridge 9 which, by way of illustration, is a hexagonal in circumference. Each clamp member 2 and 3 has formed thereon one half of the hexagonal ridge 9, that is, each carries three full sides of the hexagonal ridge. The joint in the two halves of the hexagonal ridge 9 runs from one apex 10 to the apex 11 opposite thereof. This is advantageous because the joint between the two halves of the hexagonal ridge 9 when drawn tightly together is substantially invisible. A further advantage of making the two clamp members so that the hexagonal ridge 9 is split through two opposite apices 10 and 11 is that this facilitates manufacture where the clamp members are, for example, drop forged or cast. In casting or forging draft is necessary so that the clamp members can be removed from the mold in casting, or the die in forging. This draft, which is a well accepted term in the casting art, should be at least seven degrees. Where the hexagonal ridge is formed, as described above and shown particularly in Fig. 4, this draft is considerably more than seven degrees.

The nut 4 is tapered inwardly from the center toward the end of the clamp. The nut 4 when fully screwed down forms a tight, hardly discernible joint 14 with the hexagonal ridge 9. The length of the nut 4 is equal to, and preferably slightly longer than the distance from the side of the hexagonal ridge 9 to the end of the clamp members 2 and 3. Because of this the outer curved end 15 of the nut is either flush with or projects beyond the end 16 of the clamp members 2 and 3, thus the nut 15 serves as a shield to prevent injury to the hands or clothing of the individual manipulating the rope 1.

The nut 5 is also tapered from the middle toward the end and when fully screwed down has a close joint 17 with the hexagonal ridge 9, but it should be noted that the nuts 4 and 5 when screwed tightly against the hexagonal ridge 9 have their surfaces flush therewith. Thus, the clamp when fully assembled presents a smooth surface from one end to the other and presents no sharp or rough edges which are likely to injure the hands or clothing of the individual handling the rope.

The center hexagonal ridge 9 serves an important function in the assembly of the clamp to the rope. In assembly the rope is placed in the grooves 12 and the clamp members placed in a vise so that the vise grips the opposed faces of the hexagonal ridge. By means of the vise acting on the ridge 9, the clamps are brought tightly together without in any wise mutilating the threads of the clamp. While thus held in the vise the nuts 4 and 5 can be screwed on to the clamp members.

The nut 5 when fully screwed down extends beyond the outer end of the clamp members 2 and 3 and is provided with a shield portion 18 having a hole 19 therein having a diameter equal to that of the size rope for which the clamp is designed. The hole 19 is positioned in alignment or centered with the longitudinal axis of the clamp. This shield 18 not only gives additional strength to the nut 5 but also centers the rope 1 as it projects from the clamp assembly. The fact that the rope 1 runs out of the clamp centrally or aligned with the longitudinal axis of the clamp prevents the clamp from cocking when the rope is in use. Further, the shield 18 shields the dead end of the rope. If the rope is wire rope with sharp end fibers, the shield protects the handler against injury therefrom. The shield 18 also prevents the ingress of water into the clamp.

It is evident from the above that the clamp herein shown and described is streamlined from one end to the other thus presenting a smooth clean surface which not only adds to the appearance of the clamp but makes it safe to handle. This clamp has no threads exposed to view.

I claim:

A rope clamp comprising two opposing substantially identical clamping members having longitudinal grooves in their inner faces to receive a rope therebetween, each of said clamping members having a half polygonal ridge approximately midway of its length and similar portions on each side of the half ridge in the form of half of a frustum of a cone tapered from the ridge outwardly and inwardly toward the longitudinal axis of the clamp, the said half polygonal ridges being opposed to form a polygonal ridge circumferentially of said clamp, the outer conical surfaces of said clamping members being threaded on each side of the polygonal ridge, and nuts screwed onto the tapered portions of the clamping members and extending from the ridge to the ends of the clamp members to hold them together on each side of the said ridge, the said ridge projecting beyond the external threads whereby to serve as a place for gripping the clamp during assembly upon said rope while screwing the nuts into place.

CLARENCE C. GALLAGHER.